Dec. 2, 1969  W. LITTLEJOHN  3,481,566
COVERED AIRPORT CONSTRUCTION
Filed July 20, 1967  2 Sheets-Sheet 1
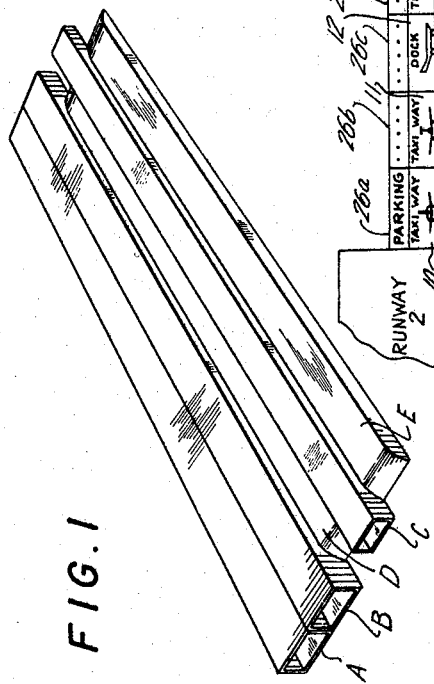
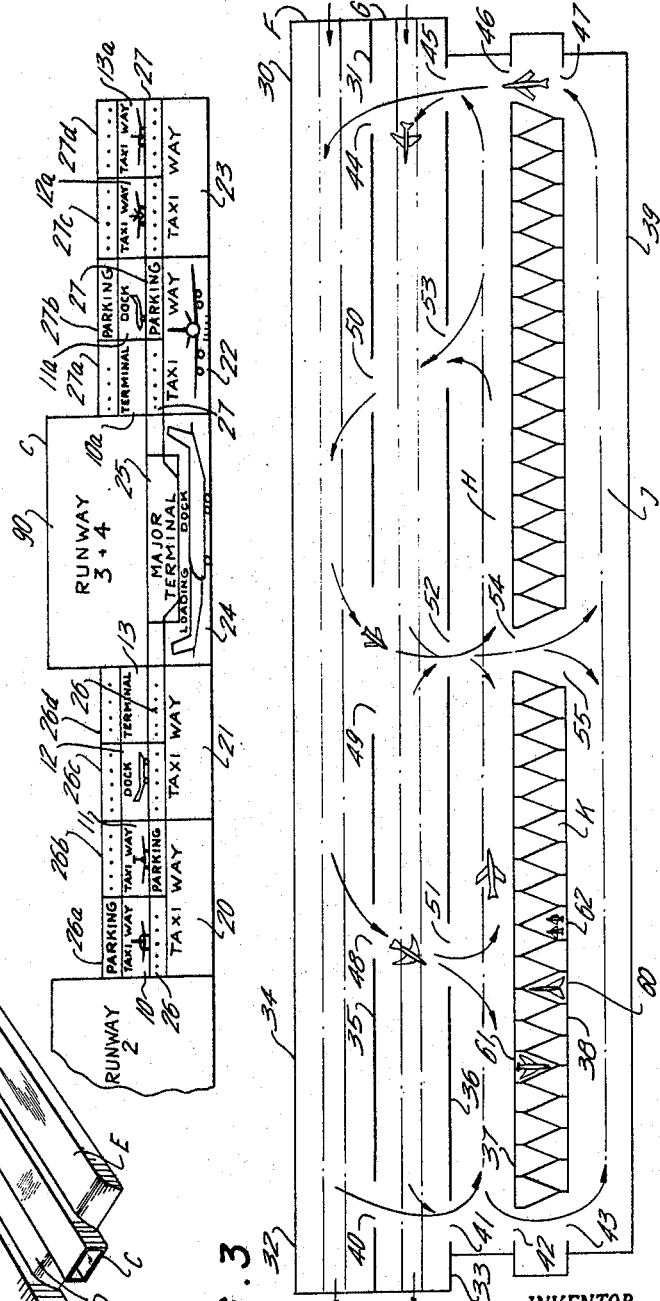
INVENTOR.
WILLIAM LITTLEJOHN
BY
ATTORNEY Dec. 2, 1969 W. LITTLEJOHN 3,481,566
COVERED AIRPORT CONSTRUCTION
Filed July 20, 1967 2 Sheets-Sheet 2

INVENTOR.
WILLIAM LITTLEJOHN
BY
ATTORNEY

United States Patent Office 3,481,566
Patented Dec. 2, 1969

3,481,566
COVERED AIRPORT CONSTRUCTION
William Littlejohn, 23425 Malibu Colony Drive,
Malibu, Calif. 90265
Filed July 20, 1967, Ser. No. 654,798
Int. Cl. B64f 1/36
U.S. Cl. 244—114                      5 Claims

ABSTRACT OF THE DISCLOSURE

The present disclosure relates to a covered airport construction, according to which the airport may be conveniently located along shorelines, rivers and expressways and close to population centers. Desirably, the airport consists of elongated covered runways for landing and take-off of airplanes, with parking facilities which may be positioned immediately adjacent the runways for simplified control of air traffic and reduced runway congestion. The wind or air direction may be controlled adjacent the inlet and outlet to the runways and there is ready provision for all-weather operation and noise suppression and abatement.

SUMMARY OF THE INVENTION

The present invention relates to a novel covered airport construction particularly designed for placement close to population centers and cities.

It is among the objects of the present invention to provide a compact airport construction having minimum space requirements and which will enable maximum utilization of airport acreage and improved site selection close to city centers, with reduced traffic and airway congestion.

Another object is to provide a novel covered airport construction in which there will be ready and economical provision for parallel runways, with reduced traffic and airway congestion and effective noise suppression and abatement.

A further object is to provide a compact multiple parallel runway system for airports, permitting all-weather operation with maximum economy in construction costs and maximum economy of space consumption.

A still further object is to provide a standardized airport system which will permit utilization of fairly high value ground facilities with shorter walking distances and ample parking, giving improved aircraft performance during hot weather, and better atmospheric control both as regards smog and wind direction in the immediate environment.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects the airport system provides a plurality of covered elongated runways of desired length for either propeller or jet planes of maximum or minimum capacity, in which parking spaces would be placed immediately adjacent the runways and along the side thereof and in which the passenger facilities, as well as automotive parking facilities, can be readily double decked or triple decked, in respects to the airport design. These airport systems may be placed alongside of rivers, expressways or even as the result of conversion of present airport facilities. The runways may be formed as aerodynamic ducts with airfoil vanes situated so that ambient winds can be diverted into the duct to develop a flow therethrough longitudinally of the runway, with such vanes also minimizing wind shear and turbulence.

The essential feature of the present application resides in the provision of a plurality of parallel runways with closely adjacent storage or parking spaces. Even with cross winds and a substantial drift angle, the vane arrangement may be such as to direct the flowing air or cross wind adjacent the entrance to the covered runway so that it will flow longitudinally of the direction of the runway. For example, the runway may have a width of 600 feet and a height below the roof of 250 feet, within which airplanes even of the largest projected size, such as 747, would have sufficient space to land and take off within the covered duct or runway as the case may be. The length of the runway may vary in accordance with the space available and the length provided for take off.

An approach of 3° to the glide slope may be provided followed by a straight level flight, allowing time for the pilot to establish a straight and level final approach at a safe controlled speed. Similar provision may be made for departure, with the climb out depending upon the aircraft performance.

Adjacent to and alongside of the main runways there may be provided taxi-ways with additional superimposed spaces for parking, passenger terminals and the like and different runways may be used for slow landing aircraft, as well as private planes.

The air directional vanes may be vertically pivoted so that they can be set at different angles at the inlet and outlet of the covered runways, and they desirably will control the flow of air across and into the inlet and outlet of the runways. These vanes, which may occupy the entire side walls of the runways, particularly at the inlet and outlet portions thereof, may be rotated 360° for maximum control and they may be contoured on one or both sides for maximum effectiveness.

The entire airport system may have widths ranging from 1500 to 2600 feet, lengths ranging around 10,000 feet, and have an acreage ranging from 345 to 600 acres. This will provide from one to three or four runways, parking for from 5,000 to 30,000 cars, and 33 to 66 major loading docks.

In regard to capacity, for example, whereas the present LaGuardia Airport in New York has an acreage of approximately 600 acres, the covered runway design or system would offer the same capacity on half this acreage. Applying the same relative standards to the present acreage of the John F. Kennedy Airport in New York, approximately 4,550 acres, through modification to the system of the present invention the same capacity could be achieved with 600 acres. In the case of Chicago's O'Hare Airport, 1,200 acres could be the equivalent in capacity of the airport's current 6,675 acres, through the system of the present invention.

It is readily possible to control smog by washing the air in the duct to remove exhaust gases and lowering the duct temperature. This will also give improved aircraft performance during hot weather, enabling the engines to develop more thrust, the wings more lift and the brakes better control, with the tires running cooler. Instant controls for crash or other accidents may be provided interiorly of the covered runways and the runways may be provided with increased friction over the center of the runway.

BRIEF DESCRIPTION OF THE DRAWINGS

With the foregoing and other objects in view, the invention consists of the novel construction, combination and arrangement of parts as hereinafter more specifically described, and illustrated in the accompanying drawings, wherein is shown an embodiment of the invention.

In the drawings wherein like reference characters denote corresponding parts throughout the several views:

FIG. 1 is a top perspective view showing a compact lay-out of the multiple runway system of the present invention.

FIG. 2 is a transverse sectional view.

FIG. 3 is a top plan view showing the position of the runways and parking places, on an enlarged scale as compared to FIGS. 1 and 2.

DESCRIPTION OF PREFERRED EMBODIMENT

Figure 4:
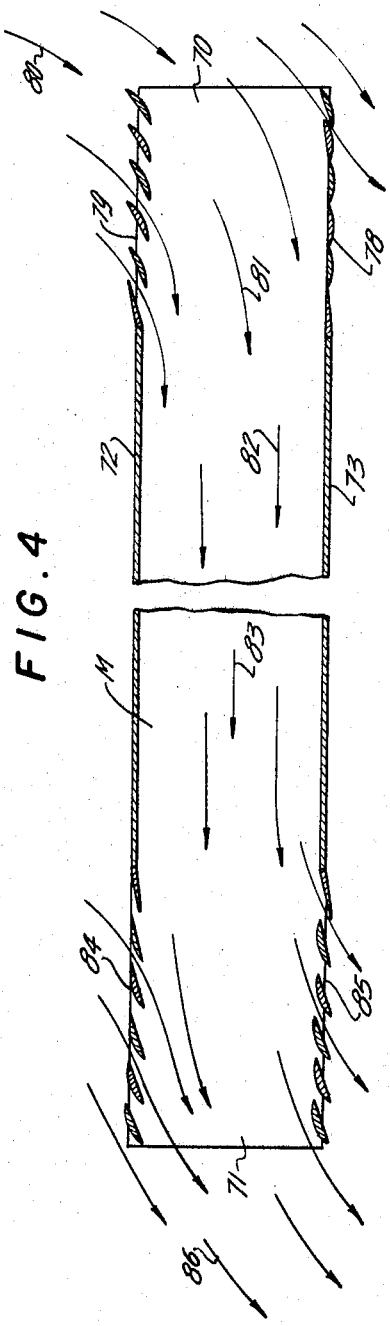
FIG. 4 is a diagrammatic horizontal cross-sectional view of one form of the runway.

Referring to FIGS. 1 and 2, there is shown three covered runways, A, B and C, with intermediate areas D and E for parking purposes both for airplanes and ground vehicles, and for taxi-ways. The runways A and B are of maximum height and width, whereas the runways C may be built over the main terminal area and are for smaller planes or for slow landing aircraft which need less runway width and length than offered by runways A and B.

As shown in FIG. 2, the lower portions 20 and 21 may serve for taxi-ways, and the same is true of 22 and 23 at the right of FIG. 2. The loading docks may also be extended to the area 24 below the passenger terminal facilities 25. The spaces at 26 and 27 may be used for automotive parking or for other passenger or freight facilities. It will be noted that in FIGS. 1 and 2 the runways are quite compact and closely spaced together, with a minimum of space consumption and a maximum of economy.

Specifically referring to FIG. 2 it will be noted that the second main runway indicated as runway 2 in FIG. 2 is immediately adjacent to the main taxi-ways 20 and 21, upon which are superimposed four areas 26 for car parking. Above these areas are two smaller taxi-ways 10 and 11, and the docking area 12 and the terminal area 13, there may be provided additional parking areas 26a, 26b, 26c and 26d. On the right of the secondary runways 3 and 4 in this space, or area C, will be the taxi-ways 22 and 23 for the large aircraft, upon which may be superimposed the automobile parking areas or parking areas 27, four being shown.

Above these parking areas 27 are the terminal area 10a, the docking area 11a and the taxi-ways 12a and 13a for the smaller aircraft. Finally, superimposed thereon will be the automobile parking areas 27a, 27b, 27c and 27d.

Referring to the lay-out of FIG. 3, there is shown two main runways F and G, having inlets and outlets at 30 and 31 and inlets and outlets at 32 and 33. The side walls 34, 35, 36, 37, 38 and 39 separate the taxi-ways, runways and parking spaces. The interior walls 35, 36, 37 and 38 are provided with the passageways 40, 41, 42 and 43 at one end and 44, 45, 46, and 47 at the other end. There are also intermediate connecting openings at 48, 49 and 50 on wall 35; at 51, 52 and 53 on wall 36; 54 on wall 37; and 55 on wall 38. These will permit ready movement of aircraft from one runway to another and from the runways to the taxi-ways. The two-way taxi-ways H and J are adjacent the loading docks K, which as shown are triangular in shape and can accommodate large planes as indicated at 60 and 61 or a plurality of smaller planes as indicated at 62. These hangars or load-docks provide convenient parking facilities for the aircraft and also permit ready overhead access both to receive and discharge passengers.

The flow arrows in FIG. 3 indicate how the large aircraft may move through the openings 40, 44, 48, 49 and 50, and also 41, 45, 51, 52 and 53 from the landing and take-off runways A and B into the taxi-ways 20, 21, 22 and 23 and the docking area 24.

Figure 5:
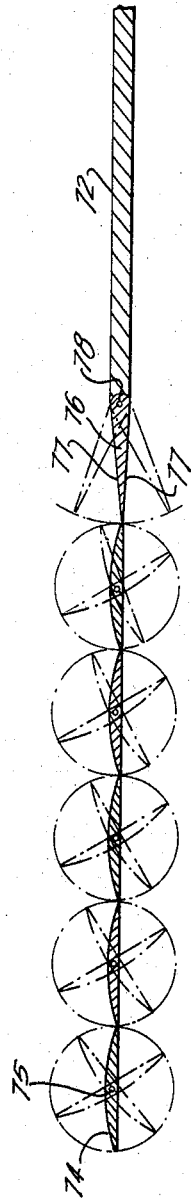
FIG. 5 is a transverse horizontal sectional view of one end of the runway.

Referring to FIGS. 4 and 5, there is shown the arrangement for controlling the flow of air across the inlets and outlets of the runways. FIG. 4 shows a runway M having an inlet 70 and an outlet 71. The side walls 72 and 73 adjacent the inlet and outlet are provided with the rotatable vertical airfoil vanes. As shown in FIG. 5, these vanes 84 have vertical shafts 75 and may be turned to a solid line position, closing the wall 72, or they may be turned so as to open the wall, as indicated by the dot and dash position. They may be rotated a total of 360° to give the effect desired. The last terminal vane 76 has a flat side 77 and is mounted on a vertical shaft 78. The rotation and adjustment of these vanes will control the air flow, as best shown in FIG. 4.

It will be noted that by closure at the side 78, while leaving the vanes open at the sides 79, the flow 80 will be turned so as to flow longitudinally at 81 and 82 down the axis 83 of the airway of the runway, enabling the plane to make a central take-off on such runway. At the landing end 71 the vanes at 84 and 85 may be bent so as to permit the flow also to be directed as indicated at 86, enabling the aircraft to come in for a central landing on such runway.

These flow control vanes as shown in FIGS. 4 and 5 will control the flow, minimize air shear and turbulence and enable control of flow in and out of the runway or airway, as the case may be. For example, a cross-wind may be readily converted into a longitudinal flow down the airway which will give directional stability and automatically correct drift or cross-angle as the aircraft is entering the channel.

As shown in FIG. 5, the rotatable louvers 84 and 85 as well as the swinging louver 77 may be so rotated as to control the direction of airflow at either end of the runway. Depending upon the direction of airflow toward or across the alternate inlet and outlet shown in FIG. 4, the control of the direction may be suitably regulated so as to aid in landing and take-off of aircraft on the covered runways.

It is thus apparent that the applicant has devised an airport construction with maximum economy of space and cost, with a greater utilization of airport acreage, enabling site selection with a lessened problem of air and ground traffic control and in regard to noise abatement and suppression. It will be possible readily to control the weather at the inlet and outlet sides of the airport and all-weather operation may be provided at low cost with standardized airport design. There will be shorter walking distances for the passengers and ample parking space, and there will be improved airport performance during hot weather.

As many changes could be made in the above covered airport construction, and many widely different embodiments of this invention could be made, it is intended that all matter combined in the above description shall be interpreted as illustrative and not in a limiting sense.

Various different combinations of runways than those shown in FIG. 2 may be employed, for example, the main runways A and B may be positioned on the outside with the intermediate runway C placed centrally and taxi-ways positioned between. This provides the best positioning for approach and take-off paths and it also eliminates crossing over of the aircraft on the main runways. It is also possible thereby to have simultaneous landings or take-offs.

Having now particularly described and ascertained the nature of the invention, and in what manner the same is to be performed, what is claimed is:

1. A covered heavier-than-air airport system comprising an elongated covered runway, or a plurality of elongated covered runways positioned in side by side relationship, said runways being of rectangular cross-section, and said runways having top walls and side walls, and said runways having inlet and outlet ends, with adjacent airplane taxiways and loading docks, passenger facilities at said loading docks, and control means in the side walls adjacent the ends to control the weather in and adjacent to the runway or runways, said control means including vertically mounted turning airfoil vanes for controlling the direction of air flow into and out of the ends of the runways, said loading docks consisting of a plurality of triangular compartments arranged the length of the system parallel to the runway or runways and having upper stories for passenger facilities.

2. The system of claim 1, said elongated runways being sufficiently long to cover the full landing requirements of an airplane and said loading docks and taxiways being arranged in parallel covered runways extending the full length of the launch elongated covered runways.

3. The airport system of claim 1, certain of said runways being of maximum width and height to receive large aircraft and others of said runways being of smaller width and lesser height to receive smaller and slower aircraft.

4. The airport system of claim 1, said runways having intervening connecting spaces to permit movement of aircraft onto and from the runways and to the loading docks.

5. The system of claim 1, said runways having two launch runways spaced apart and elongated covered extensions between said launch runways spaced apart serving as taxiways, docking areas and terminals, with parking enclosures also extending alongside and parallel to the runways and positioned above and below the taxiways.

References Cited

UNITED STATES PATENTS

| | | | |
|---|---|---|---|
| 1,780,102 | 10/1930 | Watt | 244—114 XR |
| 1,796,693 | 3/1931 | Schimmel | 244—114 XR |
| 3,061,245 | 10/1962 | Brandt | 244—114 |

FOREIGN PATENTS 384,037  10/1923  Germany.

OTHER REFERENCES

"Science and Invention," Air Transportation Station of 1950, January 1926. Page 796 relied on.

MILTON BUCHLER, Primary Examiner

P. E. SAUBERER, Assistant Examiner